T. D. INGERSOLL.
Domestic Boiler.
No. 31,807.            Patented March 26, 1861.
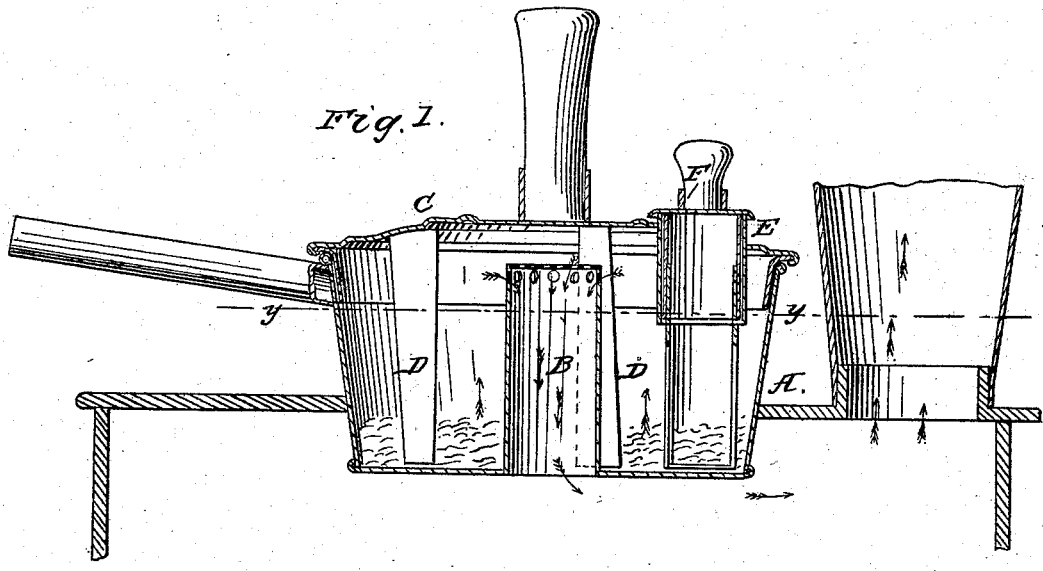
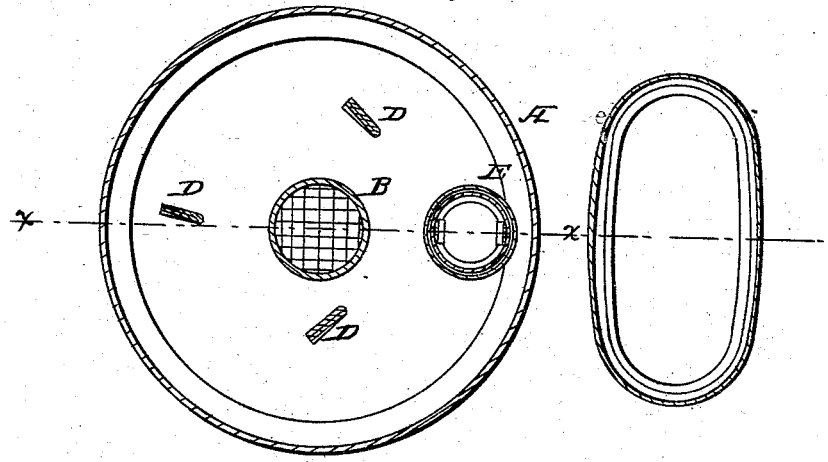
Witnesses
Inventor

UNITED STATES PATENT OFFICE.

T. DWIGHT INGERSOLL, OF MONROE, MICHIGAN.

IMPROVED CULINARY BOILER.

Specification forming part of Letters Patent No. 31,807, dated March 26, 1861.

*To all whom it may concern:*

Be it known that I, T. DWIGHT INGERSOLL, of Monroe, in the county of Monroe and State of Michigan, have invented certain new and useful Improvements in Culinary Vessels; and I do hereby declare that the following is a full, clear, and exact description of the same, reference being had to the annexed drawings making a part of this specification, in which—

Figure 1 is a vertical central section of my invention; Fig. 2, a horizontal section of the same taken in the line $x\ x$, Fig. 2.

Similar letters of reference indicate corresponding parts in the two figures.

This invention consists in providing a covered culinary vessel of any desirable form with a draft aperture or passage so arranged as to communicate with the interior of the vessel and the flue or draft passage of the stove on which the vessel is placed, in combination with one or more blades or stirrers attached to the cover of the vessel, so arranged as to stir or agitate the contents of the vessel when necessary, and also keep, when necessary, the contents down or immersed in the fluid or liquid of the vessel.

The invention still further consists in using, in connection with the cover of the vessel, a covered tube, so that access may be had to the interior of the vessel, for the purpose hereinafter specified.

To enable those skilled in the art to fully understand and construct my invention, I will proceed to describe it.

A represents a vessel, which may be of any desired or suitable form; and B is a tube, which is secured to the bottom of the vessel and extends upward nearly to its top, as shown clearly in Fig. 1.

C is a cover, which is fitted on the vessel A in the usual way, said cover being allowed to turn freely on the vessel.

The lower end of the tube B is open and communicates with the external air, while the upper end of the tube communicates with the interior of the vessel.

From the above description it will be seen that when the vessel is placed or fitted in the hole of an ordinary stove or range a communication is obtained between the interior of the vessel and the fire-chamber of the stove or range, and consequently with the flue or draft passage thereof, as shown in red in Fig. 1, and when the cover C is placed on the vessel A all steam and effluvia, which escape from the cooking substance within, will pass down through tube B into the flue of the stove or range, and therefore be prevented from escaping into the apartment in which the stove or range is placed, and in cooking certain articles—such as steak and the like—the upper part of the vessel may be heated by placing live coals on the cover C, so that the steak may be cooked simultaneously on both sides. By this means the juice of meats, during the process of cooking, is retained in them, and the meat rendered more palatable than usual, and also more healthy, and the cooking operation is performed very rapidly.

The cover C is provided with pendants D, which extend down nearly to the bottom of the vessel A, as shown clearly in Fig. 1. These pendants serve as stirrers, and are very useful in cases where the contents of the vessel require to be stirred, as in roasting coffee, &c., all that is required being to rotate the cover C, which is done without exposing the contents of the vessel. The pendants D also serve another office, to wit, the keeping of the articles being cooked at the lower part of the vessel and immersed in fluid which the vessel may contain. This is very important in certain cases where solid articles of food require to be thus immersed during the process of cooking.

In the cover C there is placed a tube, E. The tube E admits of a spoon or other instrument being inserted in the vessel A for the purpose of examining the contents of the vessel from time to time during the process of cooking. It also admits of the passage of food or liquids into the vessel, as may be required, without removing cover C.

Having thus described my invention, what I claim as new, and desire to secure by Letters Patent, is—

1. A draft aperture or passage, B, applied to a covered culinary vessel, A, when used in connection with pendants or stirrers D, attached to the cover C, substantially as and for the purpose set forth.

2. The tube E, placed in the cover C, and provided with a stopper, F, when used in connection with the draft aperture or passage B, for the purpose set forth.

T. DWIGHT INGERSOLL.

Witnesses:
JAMES VAN BUREN,
JAMES SHIELDS.